United States Patent [19]

Hahn, Jr.

[11] Patent Number: 4,521,495

[45] Date of Patent: Jun. 4, 1985

[54] PROCESS FOR COATING A WOODY SUBSTRATE AND PRODUCT

[75] Inventor: Kenneth G. Hahn, Jr., Hinckley, Ohio

[73] Assignee: SCM Corporation, New York, N.Y.

[21] Appl. No.: 624,051

[22] Filed: Jun. 25, 1984

Related U.S. Application Data

[63] Continuation-in-part of Ser. No. 547,982, Nov. 2, 1983, abandoned.

[51] Int. Cl.³ ........................ B32B 21/04; B32B 21/06

[52] U.S. Cl. ................................ 428/537.1; 427/317; 427/348; 427/393

[58] Field of Search ............... 427/317, 348, 382, 392, 427/393, 440, 386.6; 428/511, 512, 514, 513, 517, 537.1

[56] References Cited

U.S. PATENT DOCUMENTS

| | | | |
|---|---|---|---|
| 1,139,470 | 5/1915 | Aylsworth | 427/317 |
| 2,135,406 | 11/1938 | MacDonald | 427/348 |
| 2,867,543 | 1/1959 | Braun | 427/317 |
| 3,166,434 | 1/1965 | Gauger | 427/317 |
| 3,320,086 | 5/1967 | Rose et al. | 427/348 |
| 4,176,108 | 11/1979 | Caimi et al. | 427/392 |

FOREIGN PATENT DOCUMENTS

| | | | |
|---|---|---|---|
| 53-18701 | 2/1978 | Japan | 427/317 |

*Primary Examiner*—S. L. Childs
*Attorney, Agent, or Firm*—A. Joseph Gibbons

[57] ABSTRACT

A process for treating wood substrate, including textured hardboard having surface irregularities consisting of high ridge areas protruding above the surface, with a low viscosity aqueous coating to produce a coated article having substantially uniform film thickness. A substantially uniform film can be obtained by preheating the substrate (about 250° to 400° F.), flooding the surface with the aqueous coating, partially dewatering and affixing the coating to the surface by coalescence and removing the excess coating. It is necessary to critically control the substrate temperature and time in which the coating remains in contact with the heated substrate before the excess coating is removed using an air knife.

5 Claims, 1 Drawing Figure

RELATIONSHIP OF FILM THICKNESS (MILS) TO BOARD PREHEAT AND COATING RESIDENCE TIME

RELATIONSHIP OF FILM THICKNESS (MILS) TO BOARD PREHEAT AND COATING RESIDENCE TIME

PROCESS FOR COATING A WOODY SUBSTRATE AND PRODUCT

This application is a continuation-in-part of copending application Ser. No. 547,982 filed Nov. 2, 1983, now abandoned.

BACKGROUND OF THE INVENTION

The invention relates to an improved process for applying a uniform wet finish coat to woody substrate and particularly to non-uniform or textured hardboard.

Wood based fiber and particle panel materials include insulation boards, medium-density fiberboards, hardboards, particle-boards, and laminated paperboards. Hardboard and medium density fiberboard is manufactured from wood and other ligno-cellulosic materials they have been chemically converted to fibers and then reformed into panels by the application of intense heat and pressure. The heat and pressure cause the lignin in the wood to soften and form a bond, creating a dense, grainless material that has high strength and water resistance. Binders and other additives may be added prior to the pressing step.

Hardboard is pressed with a smooth surface or with a non-uniform (textured) surface. Textured hardboard is designed to simulate the irregularities of weathered wood, brick, masonry, etc. It is difficult to apply a uniform coat of paint over these textured surfaces at the low viscosity needed for coating application, i.e., in the order of from about 9 to about 15 seconds on a number 3 Zahn cup. When such low viscosity aqueous coatings are applied to the surface to textured boards the coatings run down into the low areas of the texture; it also penetrates the low density areas of the ridges and leaves these high (ridge) areas uncoated or unevenly coated. This occurs even when the coating does not exhibit sag.

Prior art techniques of adding hold-out agents and/or thickening agents to the coatings have not solved the problem. This indicates that the mere change of aqueous coating viscosity is not the solution and can actually be detrimental in producing over or premature gellation and thus causing stoppage and down-time losses.

Several attempts have been made to overcome this problem with limited success: Using a direct roll coater a very heavy film is deposited in the low areas at the ridge base while a low ridge coverage is due to the roll pressure; several applications are needed. In spray applications the paint strikes into the low density areas leaving a non-uniform surface coating. Curtain coating techniques leave uncovered the area behind the ridges, in the direction of travel. With brush coaters low areas accumulate puddles of heavy coating not removed by the brushes.

Various combinations of the above application techniques have been attempted but still fail to provide satisfactory film coverage. More recently the "pneumatic" coater technique has been applied to this operation. In this process a heavy wet film is flooded over the surface and subsequently an air-knife strips excess coating from the surface. The air knife is applied about 0.5–1.0 second following the flooding procedure. Although the air knife/flooding technique gives some improvement, coating uniformity was not acceptable even by preheating the substrate to 150° to 180° F. The present invention represents an improved process for coating uneven and irregular wood or hardboard surface by closely controlling two parameters namely (a) preheat temperature of the substrate and (b) contact time between flooding the surface and stripping excess with an air knife.

SUMMARY OF THE INVENTION

One aspect of the invention is an improved process for application of a low viscosity aqueous coating to the surface of a woody substrate, particularly hardboards, having uneven and decorative surfaces which comprises:

(a) preheating the wood substrate to a temperature in the range of about 225° F. to about 425° F. prior to application of a low viscosity aqueous coating.

(b) flooding the surface of the substrate with said coating (c) allowing the coating to remain in contact with the said preheated surface for a time period from about 0.1 to about 10 seconds, preferably 1.5 to 4.0 seconds, sufficient to insure a partial coalescence of the coating in contact with the ridge areas and affixation thereto, thus producing a substantially uniform coating on all portions of the surface prior to removing the excess coating.

(d) removing the excess coating by the direct action of an air knife.

(e) drying and curing the coating wherein the cured film is substantially of uniform thickness over the entire surface.

Another aspect is a coated article produced by the improved process and particularly textured hardboard so treated.

DETAILED DESCRIPTION OF THE INVENTION

In the treatment of wood it is common to control the moisture content of the wood by a drying operation prior to the treatment of wood with various agents. Sometimes, as in U.S. Pat. No. 3,284,157 dry wood is readjusted to a moisture content of about 28 to 35 weight percent. U.S. Pat. No. 3,166,434 teaches heating a porous substrate to 120° F. to drive off entrapped air prior to applying a polyester resin coating. U.S. Pat. No. 3,148,077 teaches method of applying powdered cellulose acetate to a heated body.

U.S. Pat. No. 3,971,856 relates to the coating of a hot pressed vegetable fiber board by applying a pigmented oil coating composition to a board having a surface temperature greater than about 250° F., drying for a predetermined time and then subjecting the coated board to at least one rotating brush to establish the decorative effect. U.S. Pat. No. 2,867,543 teaches wood impregnation with thermosetting resin after heating and vacuum treating the wood.

The above-noted impregnation and coating processes are quite different from the instant invention. In the present invention a non-viscous aqueous coating is allowed to contact and flood the surface of substrate having a highly irregular surface and having surface protrusions of various elevations designated as ridge areas. It is required that the coating remain in contact with the preheated substrate for a time sufficient to partially gel and coalesce the coating in contact with the ridge areas yet insufficient to cause complete gellation of the excess coating which has accumulated in the lower trough areas in the vicinity of the bases of the protruding ridges. Thus, the temperature of the preheated substrate is a critical parameter which must be controlled depending somewhat on the particular substrate and, in part, on the non-viscous aqueous coating to be applied. A second critical parameter is the gellation coalescence time between the flooding of the surface and the removal of the excess coating by the action of an air knife. When both these variables are suitably chosen, the depth of coating and resulting cured film on the respective elevated ridges and low portions of the board are substantially equivalent or uniform. Substantial uniformity means that the respective average film thickness readings correlate with one another within the experimental error inherent in the evaluation technique, i.e., within 0.5 units. The substrate surface should be flooded with a heat coagulatable water-dispersed liquid coating to a depth sufficient to inundate the surface, that is so that all of the high ridges are completely enveloped with coating, thus allowing to form an interfacial coagulum of coating in contact with and generally conforming to the board surface, the said coagulum lying beneath a supernatant stream of coating.

Depending on the nature of the board and nature of the aqueous coating, usually preheated board temperatures range from about 225° F. to about 425° F. Preferred temperatures are those about 300° F. When temperatures lower than 225° F. are used the proper degree of gellation does not occur in the coating adjacent to the ridge (high point) areas and unacceptable differences result in the film thickness. Desired film thickness range from about 1.25 mils to about 6.0 mils. When the temperature exceeds 425° F. premature gellation occurs and it is virtually impossible to remove the excess deposits from the trough areas located at the ridge base. As a result not only is there discrepancy in the film thickness, the thickness itself is greater than desired for practical purposes. When board temperature greatly exceeds 425° F. severe board deterioration occurs.

From the above discussion it should be obvious that within the temperature ranges suggested, the residence time, from application to removal of the non-coalesced coating, will vary. Preferred residence times are from about 1.5 seconds to about 4.0 seconds. Preferred residence time is about 1.5 seconds at board temperature of 375° F.; 2.0 seconds at 300° F.; and 4.0 seconds at 250° F.

Aqueous coatings suitable for the practice of this invention include water-dilutable compositions, emulsions, dispersions and particularly latex emulsions. Polymer latexes most useful are those prepared by emulsion polymerization of olefinically unsaturated monomers and copolymers with other unsaturated monomers and which optionally have suitable functional reactivity for curing and development of suitable film properties. Such latex may contain from 20 to 80 percent by weight solids and will have an average particle size, advantageously ranging from 2000 to 6000 Angstroms and a pH no greater than about 10.5, preferably from about 1.5 to about 9.5. Water-based epoxy compositions, acrylic and mixtures are quite suitable as polymeric binders in the aqueous coatings of the present invention. Compositions having 20–80% acrylic interpolymer derived from acrylates and containing unsaturated carboxylic acid functionality may be used as well as epoxy resins containing 20 to 80% epoxy resin. Acrylic/melamine pigmented coatings are preferred. A number of such coatings, whether water-dilutable or emulsions or dispersions, are known to the art and available commercially. Acrylic latex coatings and pigmented coatings, which are heat coagulable, are most preferred. These include acryic coatings which are crosslinkable and curable on exposure to heat or baking and/or crosslinkable by other means such as, for example, by exposure to ultra violet light.

The term curable liquid coating includes both thermosetting coating and thermoplastic coatings. Both are coagulatable on heat exposure. Thermoplastic coatings usually do not require a cross-linker component to effect cure by the usual means such as baking and/or treatment with various energy sources i.e. U.V., infrared and the like. Thermosetting coatings usually require an added 'cross-linker' component; the cross-linking mechanism is usually effected by heating to a prescribed temperature.

The aqueous coatings useful in coating the woody substrates are required to be of rather low viscosity. Usually the practiced viscosities are less than ordinary latex paints and coatings which can have viscosities of the order of above 25 to 30 seconds as determined with a number 3 Zahn cup. Preferred aqueous coating viscosities are those having a number 3 Zahn cup rating of about 12 to 15 seconds. As a point of reference, water itself gives a viscosity reading of about 8.5 seconds.

The instant coatings may advantageously be applied to the substrate as usually practiced in the hardboard art, such as, for example, a Tallman pneumatic coater.

The following examples generally illustrates the invention which should not be construed narrowly. All parts and percentages are expressed as by weight and all temperatures are expressed as degrees Fahrenheit, unless otherwise specified.

EXAMPLE 1

For coating evaluation purposes a standard hardboard was selected having a density of 48 pounds per cubic foot; a wood grain embossed design surface and a caliper reading of 0.365–0.385 inch. The hardboard was treated with a thermosetting latex having the following recipe:

| | Ingredients | Weight (Grams) |
|---|---|---|
| A | Water | 3008.0 |
| | Anionic Surfactant | 148.0 |
| | Nonionic Surfactant | 72.7 |
| | Defoamer | 62.7 |
| | Rutile $TiO_2$ | 3761.0 |
| | Crystalline Silica | 752.2 |
| | Talc | 2382.0 |
| | Tributyl Phosphate | 200.0 |
| B | Acrylic Latex | 10,530 |
| | Defoamer | 138.0 |
| | Methoxy Methylol Melamine | 1625 |

The A components were mixed in a high speed dispersion unit in the order indicated to a Hegman 6 reading. Thereafter B components are added with good mixing. The latex paint was adjusted to a viscosity of 12 seconds on a number 3 Zahn cup and charged to the Tallman pneumatic coater.

EXAMPLE 2

Pieces of a textured hardboard were preheated to various temperatures and then passed through the pneumatic coater at various speeds to give different residence times. The excess non-adherent coating was stripped with an air knife. The board, having an interfacial coagulum of coating in contact with and conforming generally to the board surface, was placed in a gas-infrared oven to achieve a board surface temperature of 360° F. as measured by a optical pyrometer—thus effecting the cure by chemical crosslinking in the case of thermosetting latex paints. In each case, one coat of the thermosetting latex paint was applied. After cure, film thicknesses were measured on the ridges and smooth spots to determine ridge coverage vs. overall application thickness. Referring to the results given in Table 1, it is seen that residence time of 0.4–0.7 seconds fails to produce an acceptable film thickness. By varying the residence time between 0.4 and 0.7 seconds at temperatures of 140°, 250°, 370°, and 400° F., dry film thicknesses on the ridge areas of from 0.78 to 1.30 mils were obtained. These results are not much improvement over the prior art coatings which typically produced films of about 0.5 to 1.0 mil using exposure times of 1.0 to 1.5 seconds at maximum percent temperatures of 180° F.

In Comparison, the improved coatings of the invention are obtained at preheat temperatures from about 250° F. to about 400° F. and exposure times of about 1.0 to about 6.0 seconds. Under these conditions film thicknesses of 1.5 mils and up are readily achieved in a single pass operation. These results are shown in Table 2. From these results, most preferred conditions can be determined as about two seconds exposure at 300° F. hardboard preheat temperature.

Referring to Table 2 and specifically to the run where preheat temperature was 300° F. and residence time 2.8, it is seen that substantially uniform correlation is obtained in dry film thickness between the average ridge film (2.32±0.5) and average flat film (2.64±0.30). Substantial uniformity means that the respective average film thickness readings correlate with one another within the experimental error inherent in the evaluation technique, i.e., within 0.5 units. Referring to the run at 400° F. preheat and residence time of 1.4 seconds an acceptable ridge coating of approximately 1.5 mils is produced.

For the purpose of graphic representation, the relationship of film thickness (mils) to residence time (seconds) is shown in FIG. 1. Actual film thickness (mils) readings, obtained under specific conditions of time and temperature, are shown as numerical values on the graph. Using such a plot, the operating conditions of temperature and time can be preselected to fall within the workable ranges and more desirably in the preferred range. As indicated earlier conditions will change somewhat depending on the specific coating applied and on other system variables. Thus the graphic representation should not be narrowly construed to limit the invention. The particular drawing was made with the idea that films of 1.5 to 3.0 mil thickness are most preferred.

TABLE 1

| Board Surface Temperature at Coater | Residence Time Prior to Air Kniving (Seconds) | Dry Film Thickness (Mils) | |
|---|---|---|---|
| | | Average Ridge | Average Flat |
| 150° F. | 0.7 | 0.78 ± .23 | 2.40 ± .55 |
| 250° F. | 0.7 | 1.00 ± .10 | 2.30 ± .45 |
| 370° F. | 0.7 | 1.28 ± .20 | 1.88 ± .24 |
| 320° F. | 0.4 | 0.66 ± .23 | 1.58 ± .40 |
| 400° F. | 0.4 | 1.30 ± .14 | 1.20 ± .26 |

TABLE 2

| Board Surface Temperature at Coater | Residence Time Prior to Air Kniving (Seconds) | Dry Film Thickness (Mils) | |
|---|---|---|---|
| | | Average Ridge | Average Flat |
| 75° F. | 5.5 | 0.66 ± .28 | 1.52 ± .31 |
| 150° F. | 5.5 | 1.7 ± .33 | 2.40 ± .38 |
| 250° F. | 5.5 | 2.2 ± .29 | 2.68 ± .38 |
| 150° F. | 2.8 | 1.18 ± .25 | 2.0 ± .32 |
| 200° F. | 2.8 | 1.8 ± .14 | 2.16 ± .05 |
| 300° F. | 2.8 | 2.32 ± .5 | 2.64 ± .30 |
| 400° F. | 2.8 | 2.5 ± .36 | 2.30 ± .24 |
| 150° F. | 1.4 | 0.66 ± .21 | 1.60 ± .32 |
| 250° F. | 1.4 | 1.10 ± .10 | 1.54 ± .27 |
| 350° F. | 1.4 | 1.40 ± .19 | 2.08 ± .30 |
| 400° F. | 1.4 | 1.46 ± .22 | 2.10 ± .61 |

COMMERICAL CONVEYOR LINES

The invention is most suited for the commercial coating of textured or ridged hardboard using a conveyor line. When using a conveyor line coating system it is important to control the line speeds. The conveyor speeds should be coordinated with (a) the board preheat temperature and time; (b) the contact time between flooding the surface and stripping excess with an air knife; and the post coating cure conditions. It is important to avoid excess dehydration of the hardboard during the board preheat cycle. Preferably the board will contain six percent water prior to the preheat cycle and from about 5 to about 5.5 on exiting this cycle.

The process applies to various latex coatings applied at a solids content of about 40–55% NV. Acrylic latex coatings are especially preferred as exemplified in the Examples. The choice of latex is not critical to the coating process itself. In addition to the terpolymer acrylic latex exemplified, other commercial acrylic latexes can be used, as for example the acrylic coatings AC-1822 and AC-658 from Rohm & Haas.

EXAMPLE 3

Figure 1:
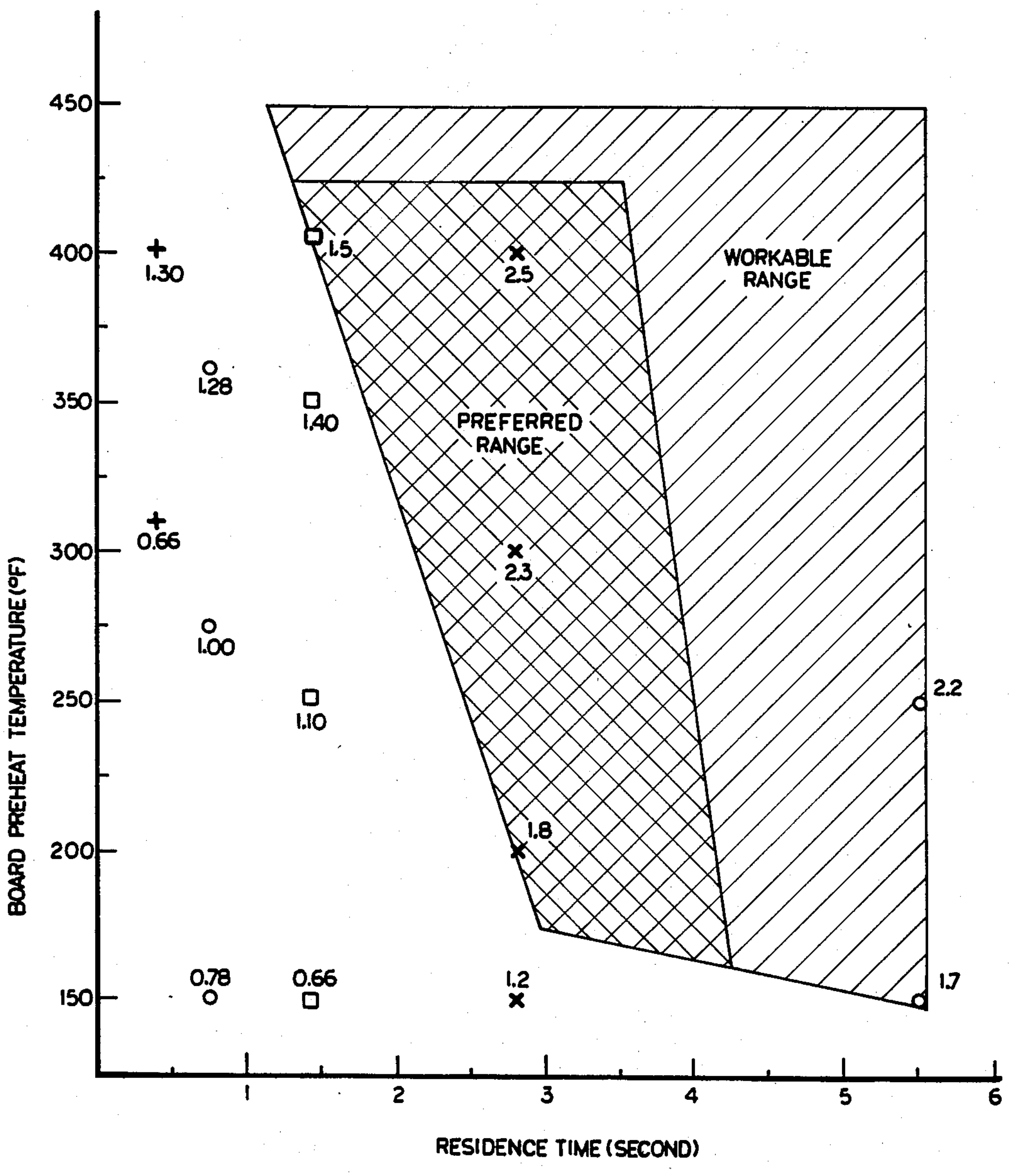
FIG. 1 is a diagram showing the workable ranges and preferred ranges of board preheat temperature and coating residence time prior to removal of excess coating.

A latex paint was formulated using the ingredients shown herein by moxing the components in the order listed:

| | Components | Weight Compounds |
|---|---|---|
| A | Water | 133.7 |
| | Cellosize QP-09-H[1] | 2.3 |
| | Tamol 731[2] | 15.1 |
| | Triton X-405[2] | 3.7 |
| | Defoamer 357[3] | 2.6 |
| | Zopaque RCL 6[4] | 293.0 |
| | Beaverwhite 325 Talc | 171.2 |
| | Triethylamine | 2.4 |
| | Minusil 10 Silica[6] | 46.5 |
| | Microcrystalline Wax | 23.5 |
| B | Water | 8.35 |
| | Acrylic Latex | 58.9 |
| | Dapro DF 880 Defoamer[7] | 6.3 |
| | Water | 5.35 |
| | Acrylic Latex | 400.00 |
| | Cymel 373[8] | 43.1 |
| | Butyl Cellusolve | 105.0 |

-continued

| Components | Weight Compounds |
|---|---|
| Surfynol TG[9] | 4.2 |

[1]The Trademark of Union Carbide Corporation
[2]The Trademark of Rohm & Haas
[3]The Trademark of Hercules, Inc.
[4]The Trademark of SCM Corporation - Titanium Dioxide
[5]The Trademark of Cyprus Industries
[6]The Trademark of Pennsylvania Glass Sand
[7]The Trademark of Daniels Products
[8]The Trademark of American Cyanamid
[9]The Trademark of Air Products Components "A" were mixed and dispersed to give a 5 Hegman reading, then the "B" components were added in the order indicated. The acrylic latex, tetrapolymer formed from methyl methacrylate/ethylacrylate/butyl acrylate/hydroxyethyl acrylate in a weight ratio of 50:10:36:4, was used at a solids content of 55 percent NV.

The paint as formed above (5 gallons) is adjusted with water to 10–11 seconds viscosity on a #3 Zahn cup and loaded to the sump of the Tallman pneumatic coater. It is circulated through the coater so that an excess of wet paint will be discharged onto the face of the ridged hardboard travelling on a conveyor. The conveyor speed is adjusted to give the paint a residence time on the board of 2.8 seconds before removal of excess paint with an air knife.

Prior to the coating, the 1 ft. by 4 ft. pieces are preheated in a gas-fired infrared oven to yield a surface temperature of 350° F. (usual oven time of 10 seconds) avoiding excessive demhumidification. The hot board is immediately fed to the Tallman conveyor retaining a temperature above 300° F. when the paint is applied. The coated board is flashed in the open for twenty (20) seconds to achieve a full dryness, heated in a gas infrared oven for 60 seconds to achieve a surface temperature of 375° F., and then allowed to cool. Microscopic examination of the board cross section shows a film thickness uniformity equivalent to that of Table I, at 300° F. and 2.8 seconds residence time.

EXAMPLE 4

Example 3 was repeated using the same components except that the final cure was 30 seconds of 300° F. hot air impinging on the surface at conveyor velocity of 300 ft./min. followed by a 30 second gas infrared oven temperature to give a board temperature of 375° F. Film thickness and uniformity were excellent.

EXAMPLE 5

When a ridged hardboard was coated according to Example 3 but the preheat reduced from 350° F. to 150° F. using a residence time of 1.4 seconds, very poor retention of coating on the high ridges of the texture results.

What is claimed is:

1. A process for applying a low viscosity aqueous coating to a woody substrate having uneven, decorative or patterned surfaces wherein the surface of the wood is flooded with an aqueous coating, the excess coating is stripped with an air knife and the residual coating of the substrate is cured by baking, which comprises:
   (a) preheating the wood substrate to a temperature in the range of from about 225° F. to about 425° F. prior to application of a low viscosity aqueous coating
   (b) flooding the surface of the substrate with the said coating;
   (c) allowing the coating to remain in contact with the said preheated surface for a residence time period, from about 0.1 seconds, to about 10.0 seconds, sufficient to allow a partial coalescence of the coating in contact with the ridge area and to produce an adhered coating over the surface prior to removing the excess coating
   (d) removing the excess coating by the direct action of an air knife
   (e) curing the adhered coating to produce a cured film of substantially uniform depth.

2. The process of claim 1 wherein the woody substrate is a hardboard and the preheating temperature is from about 250° F. to about 400° F.

3. The process of claim 2 wherein the preheating temperature is about 300° F. and residence time is about 3 seconds.

4. The process of claim 2 wherein the water-dispersed curable liquid coating comprises an acrylic latex paint.

5. A coated article prepared by the process of claim 2.

* * * * *